(12) United States Patent
Herweck et al.

(10) Patent No.: US 7,838,711 B2
(45) Date of Patent: *Nov. 23, 2010

(54) PROCESS FOR CONTINUOUS RUTHENIUM-CATALYSED METATHESIS

(75) Inventors: Thomas Herweck, Flonheim (DE); Albrecht Jacobi, Frankfurt (DE); Thomas Nicola, Ingelheim (DE); Michael Wiese, Gensingen (DE)

(73) Assignee: Boehringer Ingelheim International GmbH, Ingelheim am Rhein (DE)

( * ) Notice: Subject to any disclaimer, the term of this patent is extended or adjusted under 35 U.S.C. 154(b) by 1244 days.

This patent is subject to a terminal disclaimer.

(21) Appl. No.: 11/176,550

(22) Filed: Jul. 7, 2005

(65) Prior Publication Data
US 2006/0009667 A1    Jan. 12, 2006

(30) Foreign Application Priority Data
Jul. 8, 2004    (DE) .................. 10 2004 033 312

(51) Int. Cl.
C07C 6/00    (2006.01)
(52) U.S. Cl. .................. 585/645; 585/364; 585/419; 585/470; 585/471; 585/643; 585/708
(58) Field of Classification Search .......... 585/643, 585/645, 364, 419, 470, 471, 708
See application file for complete search history.

(56) References Cited

U.S. PATENT DOCUMENTS 3,721,718 A * 3/1973 Hughes et al. .......... 585/645
5,750,815 A * 5/1998 Grubbs et al. .......... 585/511
7,482,501 B2 * 1/2009 Leitner et al. .......... 585/353

* cited by examiner

Primary Examiner—In Suk Bullock
(74) Attorney, Agent, or Firm—Michael P. Morris; Philip I. Datlow (57) ABSTRACT

The invention relates to a process for carrying out metathesis reactions, wherein the process is carried out continuously and a ruthenium-containing catalyst is used.

8 Claims, 4 Drawing Sheets

PROCESS FOR CONTINUOUS RUTHENIUM-CATALYSED METATHESIS

BACKGROUND OF THE INVENTION

The invention relates to a process for carrying out metathesis reactions, the process being carried out continuously and using a ruthenium-containing catalyst.

A fundamental problem of macrocyclisation by ring-closing metathesis reaction (RCM) is presented by the high dilutions required and the resulting large reactor volumes. When an active substance is manufactured on a multi-tonne scale, the large reactor volumes incur major technical expenditure. There is also the danger that, with a limited reactor capacity, there will be logjams caused by insufficient capacity.

The aim of the present invention was to provide a process for carrying out metathesis reactions, particularly macrocyclisations by ring-closing metathesis (RCM), with which these disadvantages can be overcome.

It has now surprisingly been found that carrying out metathesis reactions continuously as opposed to the conventional batch method has the advantage that when they run permanently they require comparatively small reactors, thereby reducing the technical costs. Moreover, a stable continuous process should lead to fewer fluctuations in the quality of the product. The relatively small amounts of solvent contained in the system at any one time further reduce the risks incurred by the handling of highly flammable solvents.

Figure 1:
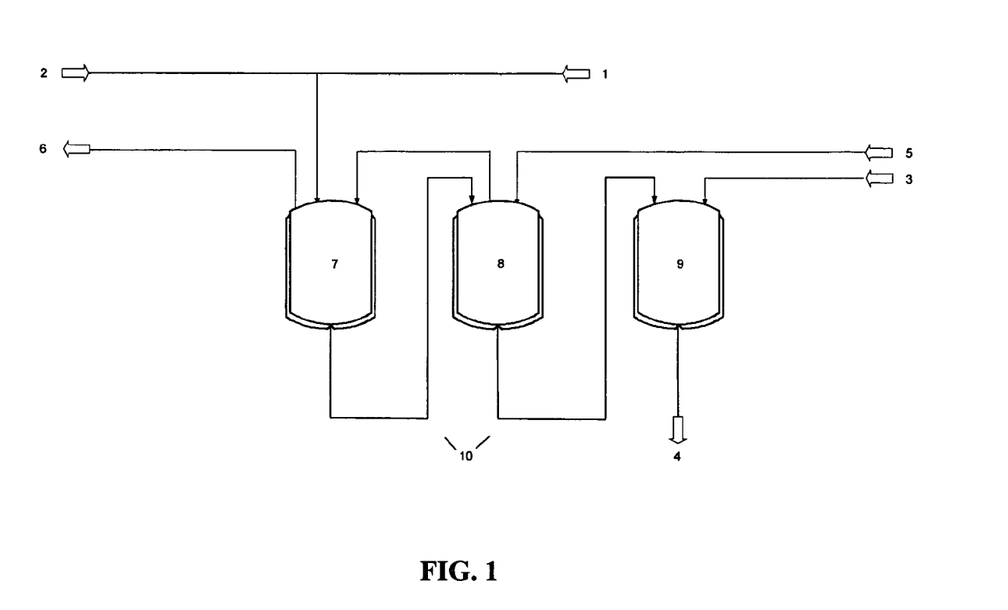
FIG. 1 This figure depicts a stirred vessel cascade system.

Examples of continuously operating systems with the possibility of ethylene removal are:

Stirred Vessel Cascade (FIG. 1)

A stirred vessel cascade is an in-series arrangement of conventional stirred vessels, in which the reaction solutions spend part of the total retention time or total reaction time in the first vessel, another part in the second etc. The solution is transferred from one vessel to the next by means of pumps or an overflow or the like. At the same time the catalyst solution may be distributed between the various vessels. Efficient elimination of ethylene is ensured by passing a counter-current of nitrogen into the different vessels. The retention time in the individual vessels is preferably such as to achieve maximum yield with as few by-products as possible. The yield of a reaction correlates with the retention time inter alia; for example, at high concentrations of catalyst, the retention time is reduced with the same yield. Conversely, a lower concentration of catalyst requires a longer retention time to achieve the same yield. At identical catalyst concentrations, the more active the catalyst, the lower the retention time required. An example of a stirred vessel cascade is shown in FIG. 1, with the numerals in the figure identifying the following: 1=educt solution, 2=catalyst solution, 3=quench, 4=product solution, 5=nitrogen, 6=exhaust, 7=reaction apparatus 1, 8=reaction apparatus 2, 9=reactor for inactivating the catalyst, 10=transfer pipes.

Figure 2:
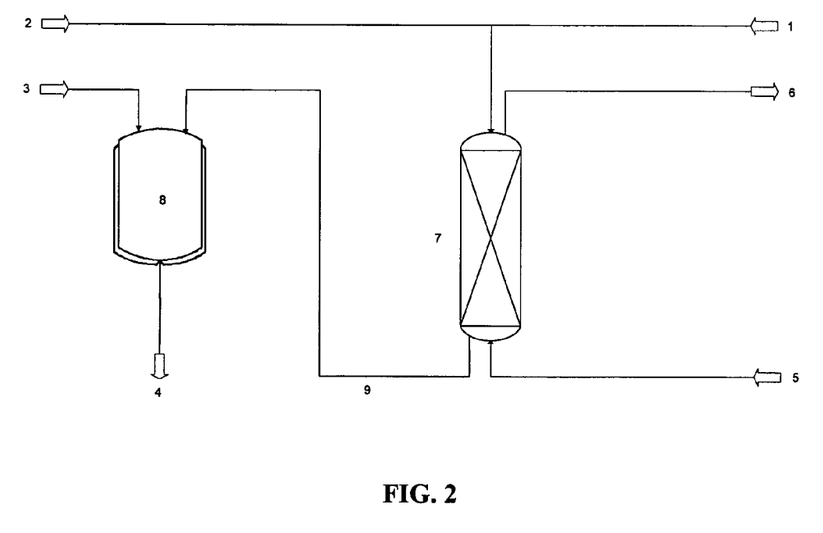
FIG. 2 This figure depicts a packed column system.

Packed Column with Introduction of $N_2$ (FIG. 2)

This is a column with a mixer or T-connection provided upstream of it, which is filled with an inert material and is charged with one or more solvent mixtures containing educts and any catalysts. The retention time in the packed column when substrate is in contact with the catalyst is determined by the volume of the packed column and the overall flow rate. The overall flow rate being the total of the individual flow rates selected for the method of delivery used, such as e.g. pumps or gravity-based systems.

The yield of a reaction correlates with the retention time inter alia; for example, at high concentrations of catalyst, the retention time is reduced with the same yield. Conversely, a lower concentration of catalyst requires a longer retention time to achieve the same yield. At identical catalyst concentrations, the more active the catalyst, the lower the retention time required. An example of a packed column is shown in FIG. 2, with the numerals in the figure identifying the following: 1=educt solution, 2=catalyst solution, 3=quench, 4=product solution, 5=nitrogen, 6=exhaust, 7=reaction column, 8=reactor for inactivating the catalyst, 9=transfer pipe.

Figure 3:
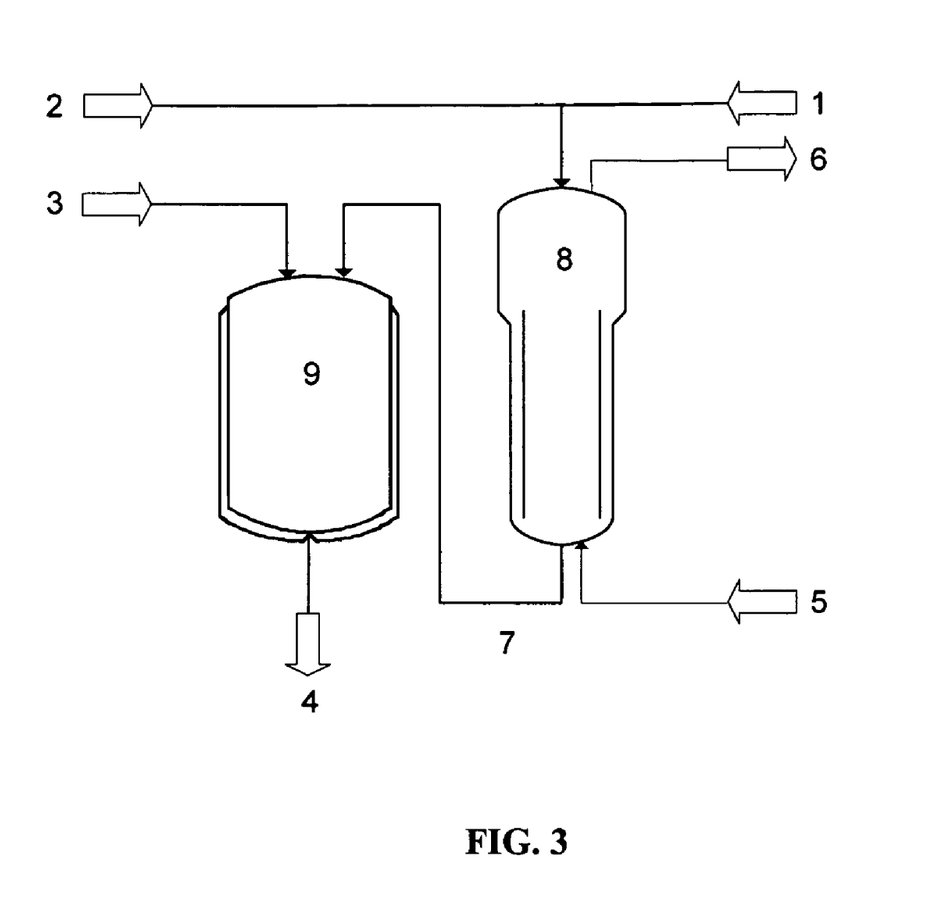
FIG. 3 This figure depicts a falling-film reactor system.

Falling-Film Reactor or Short-Path Distillation (FIG. 3)

Falling-film apparatus works on the principle that a thin film of liquid flows down the inside of a vertical tube under the effect of gravity. Heat is supplied to the falling film to heat up and/or partially evaporate the liquid. In short-path distillation, for example, the heating medium used is a heat carrier oil which is passed through a double jacket around the outside of the tube. The solution fed in from above is distributed over the temperature-controlled surface by means of a wiper device. The film thickness is dependent not only on substance-specific properties such as density and viscosity but also on throughput. The average retention time is determined from the product of the film thickness and surface area divided by the throughput.

In this particular application short-path distillation would be suitable for better removing the unwanted ethylene released during the reaction more satisfactorily than would be possible using a standard batch method. The thin film produced over a relatively large surface area enables an easier phase change of the ethylene, which can then be carried out of the reaction chamber with a continuous current of nitrogen. An example of a falling-film reactor is shown in FIG. 3, with the numerals in the figure identifying the following: 1=educt solution, 2=catalyst solution, 3=quench, 4=product solution, 5=nitrogen, 6=exhaust, 7=transfer pipe, 8=falling film reactor, 9=reactor for inactivating the catalyst.

Figure 4:
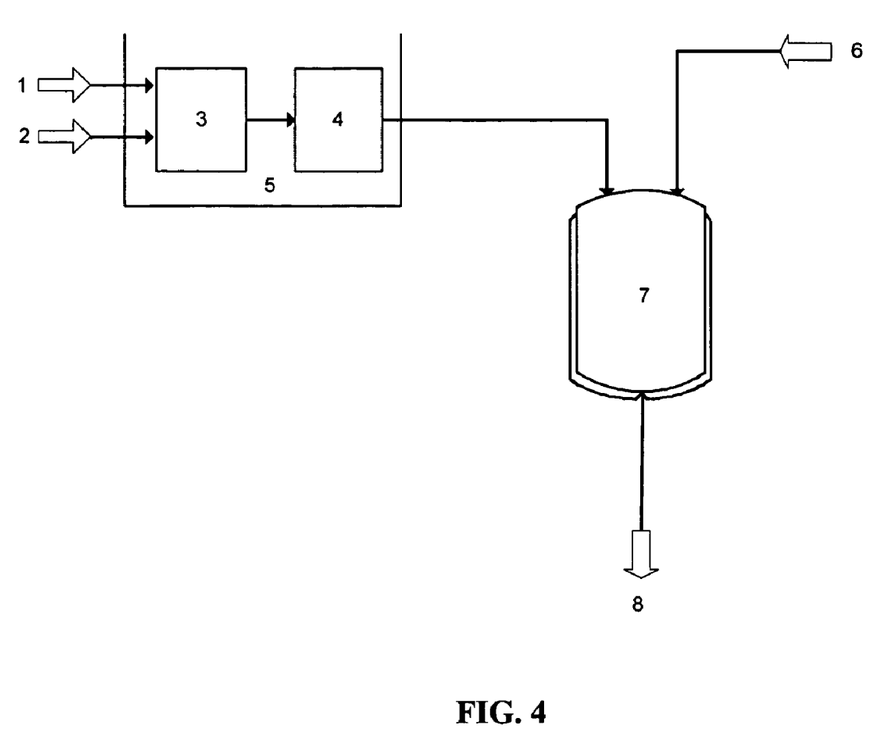
FIG. 4 This figure depicts a microreactor with retention loop system.

Microreactor with Retention Loop (FIG. 4)

The microreactor shown is a static mixer (IMM Interdigital Mixer), into which the fluids to be mixed are fed by means of pumps. Attached to the outlet of the mixer is a retention loop, the retention time being determined by a) the volume of the mixer and the length of the retention path and b) the overall flow rate, which is calculated by adding together the individual flow rates selected for the pumps. If the length of the retention path remains constant, the retention time is very easily varied by changing the pumping rates. The overall set-up can be kept at the desired reaction temperature in a temperature control bath by means of a thermostat. An example of a microreactor with retention loop is shown in FIG. 4, with the numerals in the figure identifying the following: 1=educt solution, 2=catalyst solution, 3=microreactor (reaction), 4=retention loop, 5=thermostatically controlled bath, 6=quench, 7=reactor for inactivating the catalyst, 8=product solution.

DETAILED DESCRIPTION OF THE INVENTION

It has been found that the ring-closing metathesis reaction (RCM) hitherto carried out as a batch process can also be carried out as a continuous process if suitable ruthenium catalysts are used. A significant reduction in the cost, technical equipment and space required can be achieved on the production scale compared with a batch process using large vessels. However, the small amounts of organic solvent contained in the system also serve to minimise the risks involved in handling highly flammable solvents.

The invention thus relates to a process for carrying out metathesis reactions, particularly ring-closing metathesis (RCM), the process being carried out continuously using a ruthenium-containing catalyst.

Preferably, in this process, a fivefold co-ordinated ruthenium complex with two anionic ligands, two neutral ligands and one carbene ligand is used as catalyst, while the neutral ligands may optionally be connected independently of one another to the carbene ligand.

Preferably in this process a catalyst of formula 1 is used;

1 wherein
X and X' denote anionic ligands;
L denotes a neutral ligand;
a, b, c, d independently of one another denote CO—$R^3$, $SO_2$—$R^4$ or $PO(R^5)_2$, H, halogen, $NO_2$, $C_{1-6}$-alkyl, $C_{1-6}$-alkoxy or aryl, while aryl may optionally be substituted by a group selected from among $C_{1-6}$-alkyl and $C_{1-6}$-alkoxy;
$R^1$ denotes $C_{1-6}$-alkyl, $C_{1-6}$-haloalkyl, $C_{3-6}$-cycloalkyl, $C_{7-18}$-aralkyl or a group of formula 1a, wherein the asterisk indicates the point of attachment to the molecule and 1a $R^{11}$ denotes $C_{1-6}$-alkyl, $C_{3-6}$-cycloalkyl, $C_{7-18}$-aralkyl, aryl;
$R^{12}$ denotes H, $C_{1-6}$-alkyl, $C_{3-6}$-cycloalkyl, $C_{7-18}$-aralkyl, aryl;
$R^2$ denotes H, $C_{1-6}$-alkyl, $C_{2-6}$-alkenyl, $C_{2-6}$-alkynyl or aryl;
$R^3$ denotes $C_{1-6}$-alkyl or $C_{3-6}$-cycloalkyl, both optionally being substituted by one or more groups selected independently of one another from among F, Cl, Br, I or $C_{1-6}$-alkoxycarbonyl, or aryl or heteroaryl, both optionally being substituted by one or more groups selected independently of one another from among F, Cl, Br, I, $C_{1-6}$-alkyl, $C_{1-6}$-alkoxy, $NO_2$, CN, $CF_3$, $OCF_3$ or $C_{1-6}$-alkoxycarbonyl;
$R^4$ denotes $C_{1-6}$-fluoroalkyl, aryl or heteroaryl, wherein aryl or heteroaryl may each be substituted by one or more groups selected independently of one another from among F, Cl, Br, I, $C_{1-6}$-alkyl, $C_{1-6}$-alkenyl, $C_{1-6}$-alkoxy, $NO_2$, CN, $CF_3$, $OCF_3$, $C_{1-6}$-alkoxycarbonyl, $SO_2$—$C_{1-6}$-alkyl or $SO_2$-aryl;

$R^5$ independently of one another are $C_{1-6}$-alkyl, $C_{3-6}$-cycloalkyl, aryl or heteroaryl, wherein aryl or heteroaryl in each case may be substituted by one or more groups selected independently of one another from among F, Cl, Br, I, $C_{1-6}$-alkyl, —$C_{1-6}$-alkoxy, $NO_2$, CN, $CF_3$, $OCF_3$, or $C_{1-6}$-alkoxycarbonyl; or
$R^3$, $R^4$ and $R^5$ independently of one another are a group of formula 1b, wherein the asterisk indicates the point of attachment to the molecule and 1b wherein
$X^1$ and $X^{1'}$ denote anionic ligands;
$L'$ denotes a neutral ligand;
$R^{1'}$ denotes $C_{1-6}$-alkyl, $C_{1-6}$-haloalkyl, $C_{3-6}$-cycloalkyl or —$C_{7-18}$-aralkyl;
$R^{2'}$ denotes H, $C_{1-6}$-alkyl, $C_{2-6}$-alkenyl, $C_{2-6}$-alkynyl or aryl;
$R'$ denotes $C_{1-6}$-alkyl, $C_{1-6}$-alkoxy, aryl, halogen or $NO_2$;
n' denotes 0, 1, 2 or 3.

The process is particularly preferred if a catalyst of formula 1 is used; wherein
X and X' denote anionic ligands;
L denotes a neutral ligand;
a, b, c, d independently of one another denote H, halogen, —$NO_2$, $C_{1-6}$-alkyl, $C_{1-6}$-alkoxy or aryl, while aryl may optionally be substituted by a group selected from among $C_{1-6}$-alkyl and $C_{1-6}$-alkoxy;
$R^1$ denotes $C_{1-6}$-alkyl, $C_{1-6}$-haloalkyl, $C_{3-6}$-cycloalkyl, $C_{7-18}$-aralkyl or a group of formula 1a, wherein the asterisk indicates the point of attachment to the molecule and 1a $R^{11}$ denotes $C_{1-6}$-alkyl, $C_{3-6}$-cycloalkyl, $C_{7-18}$-aralkyl, aryl;
$R^{12}$ denotes H, $C_{1-6}$-alkyl, $C_{3-6}$-cycloalkyl, $C_{7-18}$-aralkyl, aryl;
$R^2$ denotes H, $C_{1-6}$-alkyl, $C_{2-6}$-alkenyl, $C_{2-6}$-alkynyl or aryl.
Particularly preferably
$R^1$ denotes —$C_{1-6}$-alkyl, —$C_{1-6}$-haloalkyl, —$C_{3-6}$-cycloalkyl or —$C_{7-18}$-aralkyl
and most preferably
a, c, d denote H; and
b denotes —$NO_2$.

Also preferred is the process described above wherein a catalyst of formula 1 is used and
L or L' denotes a ligand of formula $P(R^4)_3$, wherein $R^4$ denotes $C_{1-6}$-alkyl, cycloalkyl or aryl; particularly preferably if L denotes a ligand of formula $L^1$, $L^2$, $L^3$ or $L^4$, wherein
- $R^5$ and $R^6$ independently of one another denote H, $C_{1-6}$-alkyl or aryl;
- $R^7$ and $R^8$ independently of one another denote H, $C_{1-6}$-alkyl, $C_{2-6}$-alkenyl or aryl; or
- $R^7$ and $R^8$ together form a 3- or 4-membered alkylene bridge; and
- Y and Y' denote halogen.

The invention also relates to the process described above for carrying out metathesis reactions, in which an educt solution $EL^1$ and a catalyst solution $KL^1$ are conveyed into a packed column and reacted therein for the appropriate retention time to form the product.

The educt solution $EL^1$ and the catalyst solution $KL^1$ may independently of one another contain as solvent (LM) organic or aqueous LM, preferably organic LM, particularly preferably aliphatic, alicyclic, aromatic, halogen-containing LM, carboxylic acid esters and ethers, most preferably pentane, hexane, cyclohexane, benzene, toluene, xylene, mesitylene, dichloromethane, chloroform, tert-butylmethyl ether, tetrahydrofuran, ethyl acetate or isopropyl acetate.

The catalyst solution may be introduced into various points of the packed column in one or more batches.

The educt solution $EL^1$ and the catalyst solution $KL^1$ are applied so that the concentration of educt in the overall solution GL is 1-100 g/l, preferably 2-65 g/l, particularly preferably 3-30 g/l, most preferably 6-16 g/l. The catalyst charge is 0.01-10 mol %, preferably 0.05-5 mol %, particularly preferably 0.1-3.5 mol %, most preferably 0.2-1 mol %, based on the educt.

The packed column is a column containing an inert filler, preferably a filler consisting of ceramics, glass, inert plastics or inert metals. The fillers may have different, expediently three-dimensional shapes, preferably cylinders, meshes, rings, beads, pyramids or the like. Fillers currently on sale include for example products sold under the brand names VSP fillers, TOP fillers, saddle fillers, Berl-saddles, Super-Torus saddles, Pall-rings, Raflux-rings or Interpak fillers.

The temperature of the packed column essentially depends on the solvents used for the reaction, as the boiling temperature of the LM should not be exceeded. Thus, the packed column may be maintained at 30-120° C., preferably 50-100° C., particularly preferably 70-90° C., most preferably 75-85° C., when toluene is used as the LM for the educt and the catalyst.

The educt solution $EL^1$ and the catalyst solution $KL^1$ may be conveyed using methods known per se, e.g. using gravity-based systems, pumps, etc. The flow rate at which the solutions are conveyed over the packed column depends on the dimensions of the packed column. Thus, the flow rate for $EL^1$ and $KL^1$, for example, in a column 100 cm long with an internal diameter of 5 cm, may be in each case 1-30 m/min, preferably 5-25 ml/min, particularly preferably 10-20 ml/min, most preferably 13-17 ml/min.

The nitrogen current in counter-flow is adjusted so as to achieve a fine distribution of the gas bubbles. The flow volume in the laboratory experiment is, for example, 0.001-0.050 $m^3/h$, preferably 0.005-0.040 $m^3/h$, particularly preferably 0.010-0.030 $m^3/h$, most preferably 0.015-0.025 $m^3/h$, for a 100 cm column.

Thus the above process is preferred for carrying out metathesis reactions, if a toluene educt solution $EL^1$ and a toluene catalyst solution $KL^1$ are conveyed into the packed column which is maintained at a temperature of 80° C. and are reacted therein for the selected retention time, under a nitrogen counter-current, to form the product.

The above process is also preferably used to carry out metathesis reactions in which an educt solution $EL^1$ and a catalyst solution $KL^2$ are conveyed in a stirred vessel cascade and pass through one or more stirred vessels to form the product.

The educt solution $EL^2$ and the catalyst solution $KL^2$ may independently of one another contain as solvent (LM) organic or aqueous LM, preferably organic LM, particularly preferably aliphatic, alicyclic, aromatic, halogen-containing LM, carboxylic acid esters and ethers, most preferably pentane, hexane, cyclohexane, benzene, toluene, xylene, mesitylene, dichloromethane, chloroform, tert-butylmethyl ether, tetrahydrofuran, ethyl acetate or isopropyl acetate.

The educt solution $EL^2$ and the catalyst solution $KL^2$ are added so that the concentration of educt in the overall solution GL is 1-100 g/l, preferably 2-65 g/l, particularly preferably 3-30 g/l, most preferably 6-16 g/l. The catalyst charge is 0.01-10 mol %, preferably 0.05-5 mol %, particularly preferably 0.1-3.5 mol %, most preferably 0.2-0.8 mol %, based on the educt.

The educt solution $EL^2$ and the catalyst solution $KL^2$ may be conveyed into and between the stirred vessels using means known per se, such as gravity-based systems, pumps or the like.

A stirred vessel cascade may consist of one or more, preferably one, two or three stirred vessels. Finally, a vessel for inactivation of the catalyst or a system for continuously deactivating the catalyst may be added on. The catalyst inactivation may be done using various chemical or physical methods, preferably by oxidation, absorption, complexing or adsorption, particularly preferably by complexing, most preferably by complexing using imidazole.

The catalyst solution may be added to the stirred vessel cascade in one or more batches. Some of the catalyst solution may be added to the first stirred vessel, another part may be added to the second stirred vessel etc. Thus, during the continuous process, the catalyst concentration in the individual vessels can be increased.

Thus, the above method is preferably used for carrying out metathesis reactions if a toluene educt solution $EL^2$ and a toluene catalyst solution $KL^2$ are fed into a stirred vessel cascade, passes through one or more stirred vessels and is finally fed directly into the catalyst inactivation in a last stirred vessel.

The above process is also preferable used for carrying out metathesis reactions wherein an educt solution $EL^3$ and a catalyst solution $KL^3$ are conveyed into one or more microreactors and reacted therein to form the product.

The educt solution $EL^3$ and the catalyst solution $KL^3$ may independently of one another contain as solvent (LM) organic or aqueous LM, preferably organic LM, particularly preferably aliphatic, alicyclic, aromatic, halogen-containing LM, carboxylic acid esters and ethers, most preferably pentane, hexane, cyclohexane, benzene, toluene, xylene, mesitylene, dichloromethane, chloroform, tert-butylmethyl ether, tetrahydrofuran, ethyl acetate or isopropyl acetate.

The educt solution $EL^3$ and the catalyst solution $KL^3$ are introduced so that the concentration of educt in the overall solution GL is 1-100 g/l, preferably 2-65 g/l, particularly preferably 3-30 g/l, most preferably 6-16 g/l. The charge of catalyst is 0.01-10 mol %, preferably 0.05-5 mol %, particularly preferably 0.1-3.5 mol %, most preferably 0.2-0.8 mol % based on the educt.

Thus, the above process is preferably used for carrying out metathesis reactions wherein a toluene educt solution $EL^3$ and a toluene catalyst solution $KL^3$ are conveyed into one or more parallel microreactors and reacted therein to form the product.

TERMS AND DEFINITIONS USED

The following terms used herein have the meanings as set forth below:

By a "metathesis reaction" is meant within the scope of the invention a reaction in which two carbon-carbon double or triple bonds are exchanged in the presence of a catalyst. Diagrammatically, a metathesis reaction with two double bonds may be illustrated as follows:

Formally, metathesis may also be interpreted as an exchange of alkylidene groups between two alkenes. Examples of alkenes for metathesis are monoolefins and dienes or polyenes.

For the ring-closing olefin metathesis corresponding dienes or polyenes with two, preferably terminal, double bonds are used (cf. also J. Am. Chem. Soc. 114, 5426 (1992); Nachr. Chem. Tech. Lab. 43, 809 (1995))

By the "overall solution" (GL) is meant within the scope of the invention a solution made up of a solution which contains the educt (EL, educt solution), and a solution which contains the catalyst (KL, catalyst solution). The overall solution may be prepared before or during the continuous process, independently of one another, from one or more batches of the educt solution and one or more batches of the catalyst solution.

By an "anionic ligand" (X or X') is meant within the scope of the invention negatively charged molecules or atoms with electron donor properties. Examples of these include halogens, trifluoroacetate or trifluoromethanesulphonate, preferably fluorine, chlorine, bromine or iodine.

By a "neutral ligand" (L) is meant within the scope of the invention uncharged or apparently neutrally-charged molecules or atoms with electron-donor properties. Examples include tertiary phosphines which contain aliphatic, cycloaliphatic and aromatic hydrocarbon groups such as trioctylphosphine, tridodecylphosphine, tricyclohexylphosphine, tris-(2-methylcyclohexyl)phosphine and tris-(o-tolyl) phosphine.

Examples of particularly preferred neutral ligands are NHC ligands such as e.g. the compounds described by formulae $L^1$, $L^2$, $L^3$ and $L^4$:

wherein $R^5$ and $R^6$ independently of one another denote H, $C_{1-6}$-alkyl or aryl, $R^7$ and $R^8$ independently of one another denote H, $C_{1-6}$-alkyl, $C_{1-6}$-alkenyl or aryl or together form a 3 or 4-membered alkylene bridge and Y and Y' denote halogen.

The term "$C_{1-6}$-alkyl" (including those which are part of other groups) denotes branched and unbranched alkyl groups with 1 to 6 carbon atoms, while the term "$C_{1-4}$ alkyl" accordingly denotes branched and unbranched alkyl groups with 1 to 4 carbon atoms. Preferred are alkyl groups with 1 to 4 carbon atoms. Examples include: methyl, ethyl, n-propyl, iso-propyl, n-butyl, iso-butyl, sec-butyl, tert-butyl, n-pentyl, iso-pentyl, neo-pentyl or hexyl. The abbreviations Me, Et, n-Pr, i-Pr, n-Bu, i-Bu, t-Bu, etc. are optionally also used for the above-mentioned groups. Unless otherwise stated, the definitions propyl, butyl, pentyl and hexyl include all possible isomeric forms of the groups in question. Thus, for example, propyl includes n-propyl and iso-propyl, butyl includes iso-butyl, sec-butyl and tert-butyl etc.

The term "$C_{2-6}$-alkenyl" (including those which are part of other groups) denotes branched and unbranched alkenyl groups with 2 to 6 carbon atoms and the term "$C_{2-4}$-alkenyl" denotes branched and unbranched alkenyl groups with 2 to 4 carbon atoms, provided that they have at least one double bond. Preferred are alkenyl groups with 2 to 4 carbon atoms. Examples include: ethenyl or vinyl, propenyl, butenyl, pentenyl, or hexenyl. Unless otherwise stated, the definitions propenyl, butenyl, pentenyl and hexenyl include all possible isomeric forms of the groups in question. Thus, for example, propenyl includes 1-propenyl and 2-propenyl, butenyl includes 1-, 2- and 3-butenyl, 1-methyl-1-propenyl, 1-methyl-2-propenyl etc.

The term "$C_{2-6}$-alkynyl" (including those which are part of other groups) denotes branched and unbranched alkynyl groups with 2 to 6 carbon atoms and the term "$C_{2-4}$-alkynyl" denotes branched and unbranched alkynyl groups with 2 to 4 carbon atoms, provided that they have at least one triple bond. Preferred are alkynyl groups with 2 to 4 carbon atoms. Examples include: ethynyl, propynyl, butynyl, pentynyl or hexynyl. Unless otherwise stated, the definitions propynyl, butynyl, pentynyl and hexynyl include all possible isomeric forms of the groups in question. Thus, for example, propynyl includes 1-propynyl and 2-propynyl, butynyl includes 1-, 2- and 3-butynyl, 1-methyl-1-propynyl, 1-methyl-2-propynyl etc.

The term "$C_{1-6}$-alkoxy" (including those which are part of other groups) denotes branched and unbranched alkoxy groups with 1 to 6 carbon atoms and the term "$C_{1-4}$-alkoxy" denotes branched and unbranched alkoxy groups with 1 to 4 carbon atoms. Preferred are alkoxy groups with 1 to 4 carbon atoms. Examples include: methoxy, ethoxy, propoxy, butoxy or pentoxy. In some cases the abbreviations MeO, EtO, PrO, etc. may be used for the above-mentioned groups. Unless otherwise stated, the definitions propoxy, butoxy and pentoxy include all possible isomeric forms of the groups in question. Thus, for example, propoxy includes n-propoxy and iso-propoxy, butoxy includes iso-butoxy, sec-butoxy and tert-butoxy etc.

The term "$C_{3-6}$-cycloalkyl" (including those which are part of other groups) denotes cyclic alkyl groups with 3 to 6 carbon atoms. Examples include: cyclopropyl, cyclobutyl, cyclopentyl or cyclohexyl. Unless otherwise stated, the cyclic alkyl groups may be substituted by one or more groups selected from among methyl, ethyl, iso-propyl, tert-butyl, hydroxy, fluorine, chlorine, bromine and iodine.

The term "aryl" (including those which are part of other groups) denotes aromatic ring systems with 6 or 10 carbon atoms. Examples include: phenyl or naphthyl, the preferred aryl group being phenyl. Unless otherwise stated, the aromatic groups may be substituted by one or more groups selected from among methyl, ethyl, iso-propyl, tert-butyl, hydroxy, fluorine, chlorine, bromine and iodine.

The term "heteroaryl" denotes five- or six-membered heterocyclic aromatic groups or 5-10 membered, bicyclic heteroaryl rings which may contain one, two or three heteroatoms, selected from among oxygen, sulphur and nitrogen, and contain so many conjugated double bonds that an aromatic system is formed. The following are examples of five- or six-membered heterocyclic aromatic groups:

The term "$C_{7-18}$-aralkyl" (including those which are part of other groups) denotes branched and unbranched alkyl groups with 1 to 8 carbon atoms which are substituted by an aromatic ring system with 6 or 10 carbon atoms, and accordingly the term "$C_{7-11}$-aralkyl" denotes branched and unbranched alkyl groups with 1 to 4 carbon atoms which are substituted by an aromatic ring system with 6 carbon atoms. Examples include: benzyl, 1- or 2-phenylethyl. Unless otherwise stated, the aromatic groups may be substituted by one or more groups selected from among methyl, ethyl, iso-propyl, tert-butyl, hydroxy, fluorine, chlorine, bromine and iodine.

EXAMPLES OF REACTIONS

All the examples of reactions are carried out on molecule A, which is reacted in a metathesis reaction with a catalyst of formula K, to form a molecule B cleaving ethylene.

B

As the yield can only be determined with any confidence during the next step, molecule B is subjected to an $S_N2$ reaction. In every case this reaction is virtually total.

B

C

NMP corresponds to N-methylpyrrolidin-2-one, $R^c$ corresponds to the group shown below, while the asterisk indicates the point of attachment to the OH group or to molecule C.

Carrying Out Metathesis in a Packed Column

A double-jacketed glass column 100 cm long with an internal diameter of 5 cm, connections for a temperature control medium, 3 outlets with closures (1st outlet halfway up, 2nd outlet underneath the frit, 3rd outlet through the frit at the nitrogen entrance) and a filter frit as base plate and for finely dividing the nitrogen piped in is filled with glass rings. The column packed with packing materials is filled with toluene to check the maximum usable volume. The flow of nitrogen in counter-current is 0.02 m³/h. With this flow volume a maximum column capacity of 1250 ml is possible. The test volume in the column is limited to 900 ml.

Method: 2000 ml of a toluene educt solution with a concentration of 20 g/l and 2000 ml of a toluene catalyst solution with 0.6 mol % catalyst K based on the educt used are conveyed through a T-connection into the packed column maintained at 80° C. The flow rates of the pumps were each adjusted to 15 ml/min. In 30 min., 900 ml of reaction solution are thus introduced into the column. After 30 min. the column is filled with 900 ml of reaction solution and the lower outlet is opened and the reaction solution is pumped into a storage container at a flow rate of 30 ml/min. This half of the reaction solution should not be used for working up at this stage, as it has been collecting in the column right from the start of the metering process and strictly speaking has not come from a continuous process. After a further 30 min, the reaction solution can be drawn off continuously (total dilution of educt: toluene=1:100). A yield of 91.5% of theoretical may be achieved. A true analysis is not carried out until step C. After the next step had been carried out in the conventional manner a yield of 46% of theoretical was obtained, based on A.

Carrying Out Metathesis in a Stirred Vessel Cascade

A 2-stage stirred vessel cascade was constructed according to the flow diagram of the process shown in FIG. 1: The dilution of 1 g A/100 ml reaction solution used in the standard batch method is retained, as is the concentration of the catalyst K of 0.6 mol %, based on A. The retention time per stirred vessel is 15 min., the total retention time is 30 min. After the second reactor, the reaction solution is fed directly into the catalyst inactivation with imidazole. After the next step had been carried out in the conventional manner a yield of C of 47% of theoretical was obtained, based on A.

We claim:

1. A process for carrying out a metathesis reaction, wherein the metathesis reaction is carried out continuously and a ruthenium-containing catalyst of formula 1 is used for the reaction:

wherein
X and X' denote anionic ligands;
L denotes a neutral ligand;
a, b, c, d independently of one another denote —CO—$R^3$, —$SO_2$—$R^4$ or —PO($R^5$)$_2$, H, halogen, $NO_2$, $C_{1-6}$-alkyl, $C_{1-6}$-alkoxy or aryl, while aryl is optionally substituted by a group selected from among $C_{1-6}$-alkyl and $C_{1-6}$-alkoxy;

$R^1$ denotes $C_{1-6}$-alkyl, $C_{1-6}$-haloalkyl, $C_{3-6}$-cycloalkyl, $C_{7-18}$-aralkyl or a group of formula 1a, wherein the asterisk indicates the point of attachment to the molecule and 1a $R^{11}$ denotes $C_{1-6}$-alkyl, $C_{3-6}$-cycloalkyl, $C_{7-18}$-aralkyl, or aryl;

$R^{12}$ denotes H, $C_{1-6}$-alkyl, $C_{3-6}$-cycloalkyl, $C_{7-18}$-aralkyl, or aryl;

$R^2$ denotes H, $C_{1-6}$alkyl, $C_{2-6}$-alkenyl, $C_{2-6}$-alknyl or aryl;

$R^3$ denotes $C_{1-6}$-alkyl or $C_{3-6}$-cycloalkyl, both optionally substituted by one or more groups selected independently of one another from among F, Cl, Br, I or $C_{1-6}$-alkoxycarbonyl, or aryl or heteroaryl both optionally being substituted by one or more groups selected independently of one another from among F, Cl, Br, I, $C_{1-6}$-alkyl, $C_{1-6}$-alkoxy, $NO_2$, CN, $CF_3$, $OCF_3$ or $C_{1-6}$-alkoxycarbonyl;

$R^4$ denotes $C_{1-6}$-fluoroalkyl, aryl or heteroaryl, wherein aryl or heteroaryl in each case may be substituted by one or more groups selected independently of one another from among F, Cl, Br, I, $C_{1-6}$-alkyl, $C_{1-6}$-alkenyl, $C_{1-6}$-alkoxy, $NO_2$, CN, $CF_3$, $OCF_3$, $C_{1-6}$-alkoxycarbonyl, $SO_2$—$C_{1-6}$-alkyl or $SO_2$-aryl;

$R^5$ independently of one another are $C_{1-6}$-alkyl, $C_{3-6}$-cycloalkyl, aryl or heteroaryl, wherein aryl or heteroaryl may each be substituted by one or more groups selected independently of one another from among F, Cl, Br, I, $C_{1-6}$-alkyl, —$C_{1-6}$-alkoxy, $NO_2$, CN, $CF_3$, $OCF_3$, $C_{1-6}$-alkoxycarbonyl; or $R^3$, $R^4$ and $R^5$ independently of one another are a group of formula 1b, wherein the asterisk indicates the point of attachment to the molecule 1b wherein $X^1$ and $X^1$ denote anionic ligands;

L' denotes a neutral ligand;

$R^{1'}$ denotes $C_{1-6}$-alkyl, $C_{1-6}$-haloalkyl, $C_{3-6}$-cycloalkyl or —$C_{7-18}$-aralkyl;

$R^{2'}$ denotes H, $C_{1-6}$-alkyl, $C_{2-6}$-alkenyl, $C_{2-6}$-alkynyl or aryl;

R' denotes $C_{1-6}$-alkyl, $C_{1-6}$-alkoxy, aryl, halogen or $NO_2$; and n' denotes 0, 1, 2 or 3.

2. A process according to claim 1, wherein the reaction is a ring-closing metathesis reaction.

3. A process for carrying out a metathesis reaction according to claim 1, wherein an educt solution $EL^1$ and a catalyst solution $KL^1$ are conveyed into a packed column and reacted there for a selected retention time to form a product.

4. A process for carrying out a metathesis reaction according to claim 1, wherein a toluene educt solution $EL^1$ and a toluene catalyst solution $KL^1$ are conveyed into a packed column maintained at a temperature of 50-100° C. and reacted therein for a selected retention time, under a nitrogen counter-current, to form a product.

5. A process for carrying out a metathesis reaction according to claim 1, wherein an educt solution $EL^2$ and a catalyst solution $KL^2$ are conveyed into a stirred vessel cascade, passed through one or more stirred vessels and then fed into a catalyst inactivation region in a last stirred vessel.

6. A process for carrying out a metathesis reaction according to claim 1, wherein a toluene educt solution $EL^2$ and a toluene catalyst solution $KL^2$ are conveyed into a stirred vessel cascade, passed through one or more stirred vessels and then fed into a catalyst inactivation region in a last stirred vessel.

7. A process for carrying out a metathesis reaction according to claim 1, wherein a plurality of stirred vessels are used in sequence and in each stirred vessel the catalyst concentration is increased relative to the previous stirred vessel.

8. A process for carrying out a metathesis reaction according to claim 1, wherein an educt solution $EL^3$ and a catalyst solution $KL^3$ are conveyed into one or more microreactors and reacted therein to form a product.

* * * * *